PATTERN RECOGNITION AND INSPECTION SYSTEM
Filed June 11, 1958
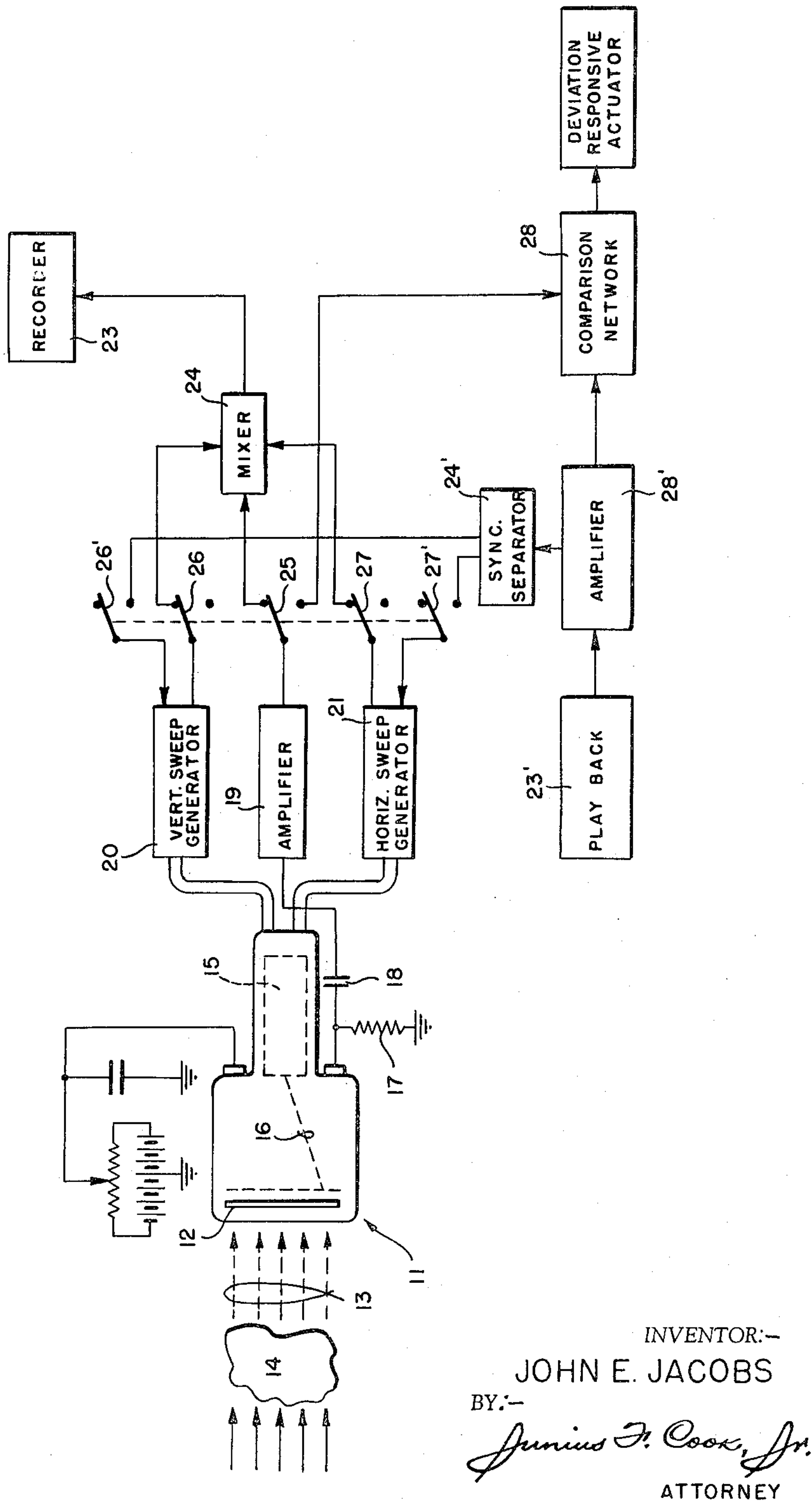
INVENTOR:-
JOHN E. JACOBS
BY:-
Junius F. Cook, Jr.
ATTORNEY United States Patent Office 2,995,728

Patented Aug. 8, 1961

2,995,728

PATTERN RECOGNITION AND INSPECTION SYSTEM

John E. Jacobs, Hales Corners, Wis., assignor to General Electric Company, a corporation of New York Filed June 11, 1958, Ser. No. 741,336
2 Claims. (Cl. 340—149)

The present invention relates in general to product inspection, and has more particular reference to the inspection of articles to determine the conformity thereof with a perfect or master sample.

An important object of the present invention is to provide improved means for and method of automatic product inspection to determine the conformity of the inspected articles with a perfect or master sample; a further object being to provide for comparing the physical characteristics of an article under inspection with a record of the characteristics of a perfect or master sample article.

Another important object is to provide for the inspection of an article by reproducing an electrical signal corresponding with the characteristics of a perfect or master sample article, by playing a record of said signal, while simultaneously deriving a signal corresponding with the like characteristics of the article being inspected and comparing the so derived signal with the signal so reproduced from said record.

Another important object is to provide for the recordation of electrical signals corresponding with the X-ray pattern or picture of a master sample article and then comparing said recorded signal with like signals corresponding with the X-ray picture image of an examination article to determine its similarity to the master sample.

Briefly stated, the present invention contemplates the placement of a master sample article in a precisely selected viewing position with respect to and in front of an iconoscope, applying X-rays through the master sample upon the pickup screen of the iconoscope, operating the iconoscope to produce electrical signals corresponding with the image of the sample article as applied on the pickup screen, and making a preferably magnetic tape record of the signal. Such record may then be formed into a loop and applied in suitable playback apparatus to thus reproduce the recorded signal. At the same time, an examination article to be compared with the master sample may be disposed, with respect to the iconoscope, in precisely the same position occupied by the master sample during the recordation of the signal corresponding with its image as applied on the iconoscope pickup screen. The iconoscope may then be operated to produce a signal corresponding with the image of the examination article as applied on the pickup screen, and the signal thus developed may be compared with the signal reproduced from the master record, signal identity indicating conformity of the examination and master samples; and means may be provided for indicating a discrepancy between the recorded and sample signals or for operating suitable mechanism for rejecting any examination sample that does not substantially conform with the master sample, as defined in the signal record thereof.

The foregoing and numerous other important objects, advantages and inherent functions of the invention will become apparent as the same is more fully understood from the following description, which, taken in conjunction with the accompanying drawing, discloses a preferred embodiment of the invention.

Referring to the drawing:

The single figure of the drawing is a diagrammatic representation of apparatus for making a record of signals corresponding with the X-ray transmitted picture image of a master sample, and for comparing such recorded signals with similar signals derived from the X-ray picture image of a test sample article.

To illustrate the invention the drawing shows apparatus for recording, reproducing and comparing electrical signals corresponding with X-ray picture images of articles to be compared. The apparatus comprises an iconoscope 11 having a photosensitive screen 12 adapted to receive picture carrying rays 13, such as X-rays, which emanate from any suitable ray source and which latently carry the image of an object 14 disposed in the path of the rays, between the ray source and the screen 12. The iconoscope is adapted to produce electrical signal impulses corresponding with the characteristics of the picture image applied on the screen 12 by the rays 13. To this end, the iconoscope 11 may embody an electron gun structure 15 and associated components for applying a scanning beam 16 upon the screen 12 in order to produce signals corresponding with the picture image applied in the screen.

While any suitable or preferred iconoscope may be employed, the present invention contemplates use of a picture transducing device of the sort shown in U.S. Letters Patent No. 2,809,323, in which, by the action of the scanning beam 16, the picture image applied on the screen 12 may be accurately defined in terms of a fluctuating signal voltage developed across a resistor 17 and applied thence through a condenser 18 to actuate any suitable or preferred amplifying system 19.

The scanning movement of the beam 16 may be controlled in conventional fashion. As shown, the vertical and horizontal beam controlling components of the gun structure may be energized by connection with vertical and horizontal sweep impulse generators 20 and 21 of any suitable or preferred character. Since the present invention contemplates operation of the iconoscope to scan the picture image preferably at a relatively slow rate of speed of the order of one complete picture scan per second, one of the sweep impulse generators should be operated at a corresponding scanning frequency of the order of one cycle per second, while the other sweep impulse generator should be operated at a frequency sufficient to obtain as many scanning sweeps of the beam 16 as may be required to perform a complete scan of the picture image in the selected scanning interval.

In order to record the picture defining signal developed at the resistor 17 and transmitted thence to the amplifier 19, the output side of said amplifier and the sweep impulse generators 20 and 21 may be connected with any suitable, preferably magnetic, recorder 23 capable of accurately recording the signals transmitted through the amplifier 19. The recorder 23, of course, may be connected with the amplifier 19 and also with the sweep impulse generators 20 and 21 through a mixing circuit 24 of any preferred or any conventional character, the same being connected with the amplifier 19 preferably through a double throw switch 25, the mixing circuit 24 being connected with the vertical and horizontal sweep impulse generators respectively through double throw switches 26 and 27.

A picture record thus produced by operation of the recorder 23 may not only contain a picture defining record of the signal developed at the resistor 17, but also recorded signal components corresponding with the scanning beam control signals produced by the generators 20 and 21. Accordingly, the recorded picture defining signals may be reproduced by operating conventional record reproducing or playback apparatus.

In order to provide for the comparison of examination objects with a master or perfect sample article, a master sample article may first be placed in a precisely selected picturing position with respect to and in front of the iconoscope 11 so that a penetrating ray carried picture of the sample article may be applied upon the pickup screen of the iconoscope 11, and the recorder 23 operated to produce a master record of signals corresponding with the image of the master article as applied on the iconoscope screen. Thereafter the master record thus produced may be applied in suitable playback apparatus in order to reproduce the recorded signals. At the same time, examination objects for articles for comparison with the master sample may be disposed, with respect to the iconoscope, successively in precisely the same picturing position occupied by the master sample during the recordation of signals corresponding with its image on the iconoscope pickup screen. The iconoscope may then be operated to produce signals corresponding with the image of the examination article as applied upon the pickup screen of the iconoscope, and the signals thus developed may be compared with the signals reproduced from the master record.

To these ends, a record strip, produced in the recorder 23 and containing recorded signals corresponding to the master sample article, may be formed into an endless loop and mounted in a playback device 23' of any suitable, preferred or conventional character and capable of accurately reproducing signals corresponding with those recorded in the record strip. The signals thus reproduced in the playback device 23' may be applied to drive an ampjlifier 28' which may be controllingly connected with the vertical and horizontal sweep impulse generators 20 and 21 through conventional filter means 24' capable of separating the beam sweep signal components from the composite signal delivered by the playback apparatus 23' to the amplifier 28', said filter means 24' being connected with the sweep impulse generators respectively through double throw switches 26' and 27'.

The selectively closable contacts of the double throw switch 25 may be connected respectively with the mixer 24 and the comparison network 28. The switches 25, 26, 26', 27 and 27' are preferably ganged together for operation in unison, the switches 26 and 27 being arranged to connect the vertical and horizontal sweep impulse generators with the mixer, only when the amplifier 19 is also connected with the mixer through the switch 25. The switches 26' and 27' are arranged to connect the filter means 24' with the sweep generators, only when the amplifier 19 is connected with the comparison network 28 through the switch 25. As a consequence, the iconoscope 11, amplifier 19 and sweep impulse generators will be connected, through the mixer 24, with the recorder 23 during the production of a record of signals corresponding with a picture applied on the screen 12. The switches also serve to disconnect the iconoscope and associated equipment from the mixer 24 and recorder 23, and to connect the same with the playback apparatus in order to provide for the comparison of signals corresponding with the screen applied picture of an examination object with signals reproduced from the master record.

In this connection, it will be seen that the recorded signal components applied upon the sweep impulse generators 20 and 21 through the filter network 24' will serve to control the operation of the iconoscope scanning beam in synchronism with the reproduction of master record signals corresponding with the characteristics of the master article. As a consequence, the signals delivered through the amplifier 19 will be applied upon the comparison network 28 in synchronism with corresponding signals reproduced from the master record and delivered upon the comparison network through the amplifier 28'. Any deviation or discrepancy between the signals thus applied in synchronism upon the comparison network may be applied to operate a deviation responsive actuator which, in turn, may be used to drive a deviation indicator of any suitable or preferred character, or conventional apparatus for marking or otherwise rejecting an examination article that does not conform with the characteristics of the master sample.

It is thought that the invention and its numerous attendant advanages will be fully understood from the foregoing description, and it is obvious that numerous changes may be made in the form, construction and arrangement of its several parts without departing from the spirit or scope of the invention, or sacrificing any of its attendant advantages, the form herein disclosed being a preferred embodiment for the purpose of illustrating the invention.

The invention is hereby claimed as follows:

1. Inspection apparatus comprising an iconoscope having a radiation sensitive screen, an output circuit, and means responsive to two deflection voltages to deflect the beam across said screen in different respective directions to produce image currents in said output circuit, means to record said deflection voltages and image currents while said screen is exposed to radiation representing a first object to be inspected, means to reproduce said recorded image currents and deflection voltages in the same time relationship in which they were recorded, means to substitute the reproduced deflection voltages for said first deflection voltages while said screen is exposed to radiation representing a second object to be inspected, and means responsive to the difference between the image currents representing said second object and said reproduced image currents.

2. In an inspection apparatus, the combination of an iconoscope having a radiation sensitive screen, an output circuit, and means responsive to two deflection voltages to deflect the beam across said screen in different respective directions to produce image currents in said output circuit, means to record on a common medium said image currents and said deflection voltages while said screen is exposed to radiation representing an object to be examined, means to reproduce all said currents, means to separate said two reproduced deflection voltages from each other and from said reproduced image currents, means to substitute said reproduced deflection voltages for the corresponding first mentioned deflection voltages while said screen is exposed to radiation representing a second object to be inspected thereby to produce image currents representing said second object and means to compare said last image currents with the reproduced image currents to detect the difference in said objects.

References Cited in the file of this patent

UNITED STATES PATENTS

| | | |
|---|---|---|
| 2,679,636 | Hillyer | May 25, 1954 |
| 2,712,898 | Knutsen | July 12, 1955 |
| 2,731,621 | Sontheimer | Jan. 17, 1956 |